April 6, 1954        A. M. KIRK        2,674,097
MASTER CYLINDER HAVING A BOOSTER IN COMBINATION THEREWITH
Filed July 27, 1950        2 Sheets-Sheet 1
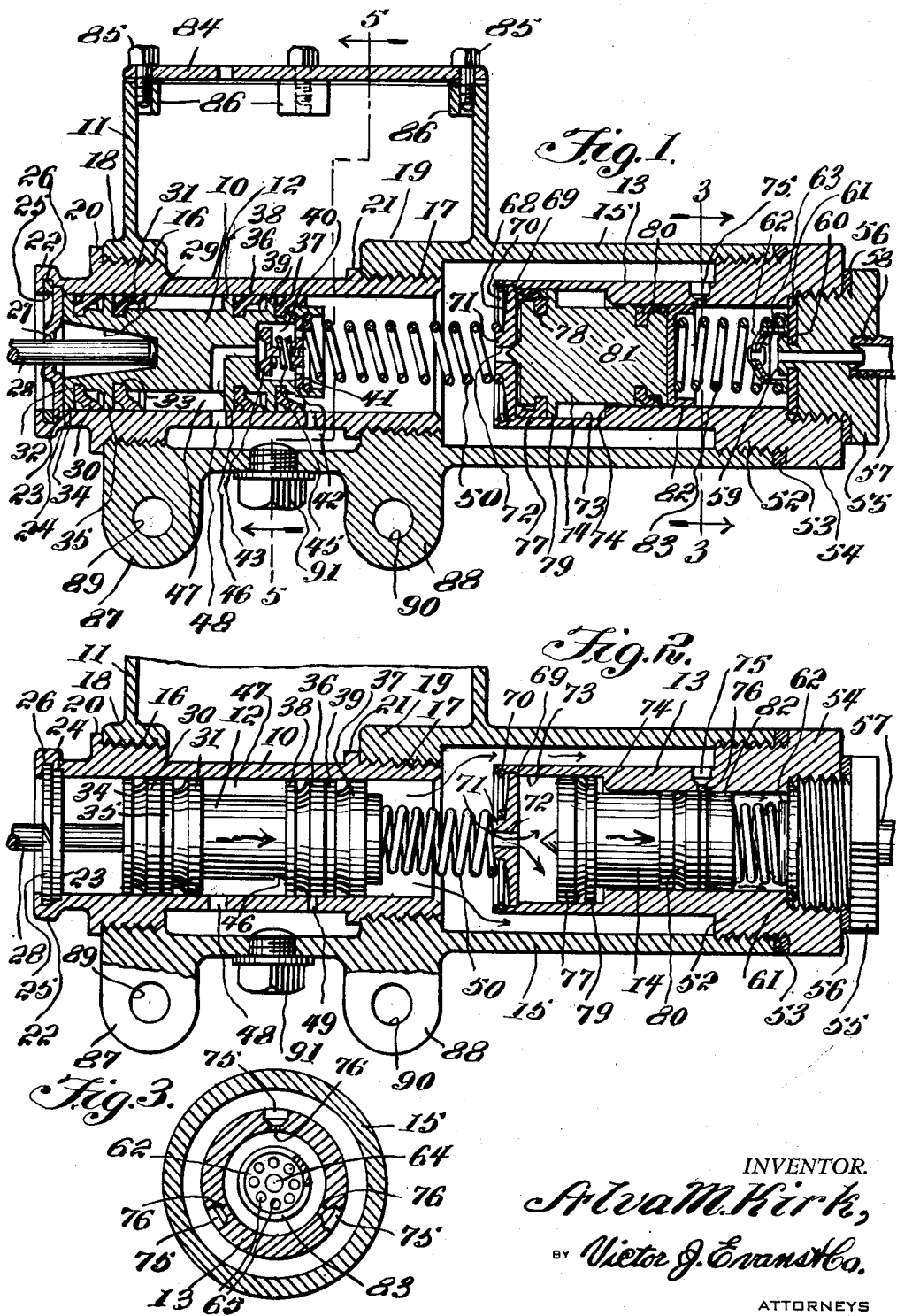
INVENTOR.
Alva M. Kirk,
BY Victor J. Evans & Co.
ATTORNEYS April 6, 1954  A. M. KIRK  2,674,097
MASTER CYLINDER HAVING A BOOSTER IN COMBINATION THEREWITH
Filed July 27, 1950  2 Sheets-Sheet 2
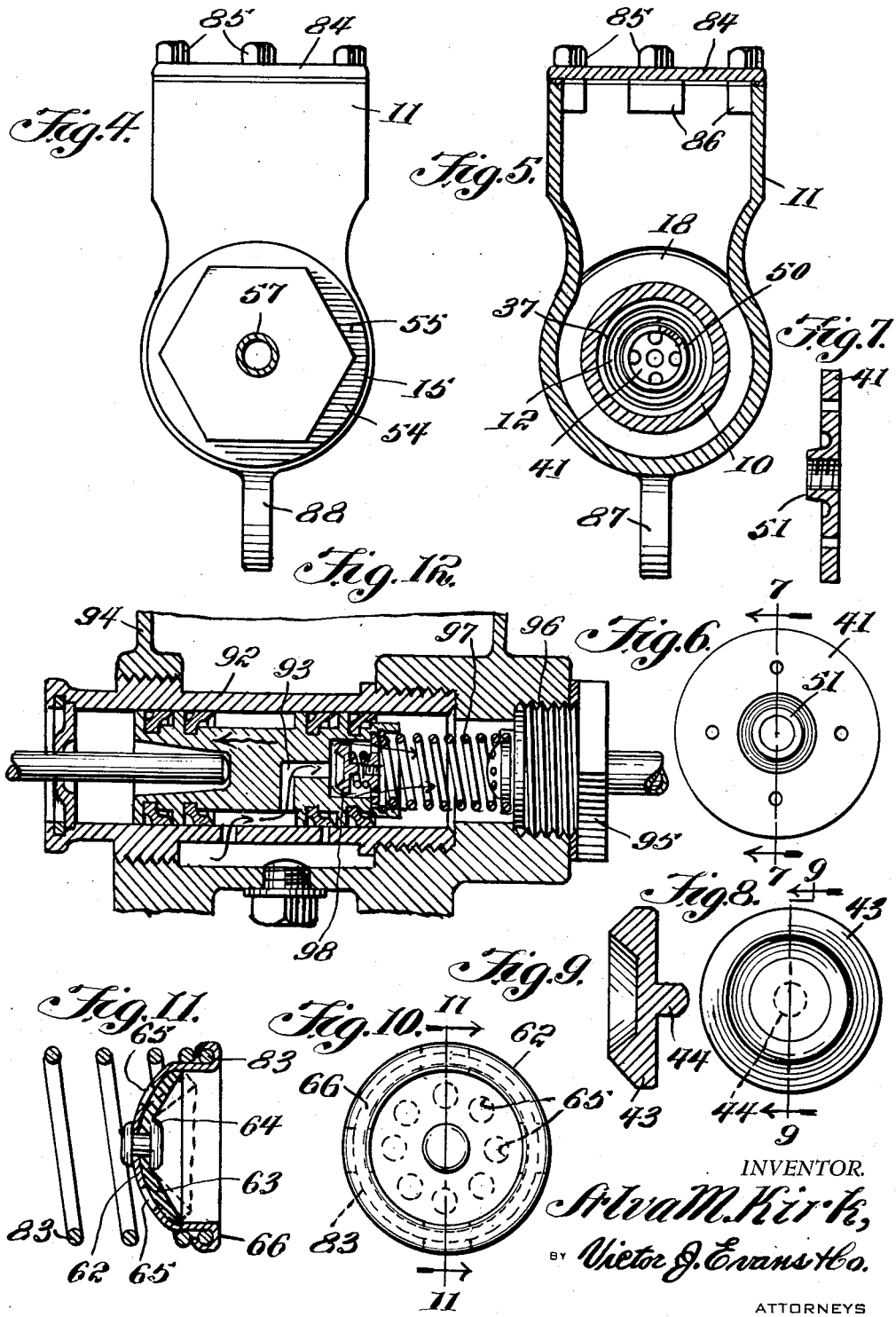
INVENTOR.
Alva M. Kirk,
BY Victor J. Evans & Co.
ATTORNEYS

Patented Apr. 6, 1954

2,674,097

UNITED STATES PATENT OFFICE 2,674,097

MASTER CYLINDER HAVING A BOOSTER IN COMBINATION THEREWITH

Alva M. Kirk, Yazoo City, Miss., assignor, by direct and mesne assignments, of four per cent to John S. Holmes, twenty-one per cent to Harris Bunch, twenty-one per cent to Durwood Teaster, and three per cent to Prentiss Terrell Russell, all of Yazoo City, Miss., and three per cent to J. J. Erickson Application July 27, 1950, Serial No. 176,204

2 Claims. (Cl. 60—54.6)

This invention relates to brake systems of motor vehicles and particularly master cylinders of brake systems, and in particular this invention relates to a master cylinder having a booster in combination therewith wherein brakes are actuated, first by brake fluid from a low pressure area in the cylinder and booster and with a slight continued forward movement of the brake pedal high pressure fluid is provided in the booster and directly applied to the brakes.

The purpose of this invention is to improve the operation of master cylinders of brake systems whereby fluid pressure applied to brakes of a vehicle is built up gradually and smoothly whereby the pressure of the brakes is evenly and at the same time positively applied.

In the conventional master cylinder a foot pedal drives the fluid into the brake system by means of a piston in a cylinder and excessive pressure is returned to the storage compartment of the master cylinder through a by-pass. With the elements directly connected scale developing from rust and corrosion works small rubber cup-shaped discs and packing rings and leaks result therefrom. Master cylinders of the conventional type also use sealing rings only at the ends of the plunger or piston and when the end ring is damaged the pressure of the brake fluid is lost. With this thought in mind this invention contemplates a master cylinder having a housing with a removable cylinder threaded in hubs therein, with a foot pedal actuated piston slidably mounted in the cylinder and with a booster cylinder having a high pressure piston therein extended from one side of the housing and having a connection extended therefrom to the brake system of a vehicle in which the device is installed.

The object of this invention is, therefore, to provide means for constructing a combination master cylinder and booster whereby low and high pressure areas are obtained by pistons in aligned cylinders and whereby high pressure is created with a continued movement of the foot or brake lever.

Another object of the invention is to provide a combination master cylinder and booster wherein the parts are arranged to eliminate damage caused by scale, corrosion, and the like.

Another object of the invention is to provide a combination master cylinder and booster that may be installed in brake systems and fluid pressure actuated devices now in use.

A further object of the invention is to provide a combination master cylinder and booster for brake and other fluid pressure systems which is of a comparatively simple and economical construction.

With these and other objects and advantages in view the invention embodies a master cylinder housing having a cylindrical casing extended therefrom with a cylinder removably mounted in the housing, another cylinder removably mounted in the extended casing and with pistons and suitable packing and resilient elements provided in the cylinders whereby low pressure areas are first created, and, with continued movement of a brake pedal, a high pressure area is provided in the outlet end of the booster.

Other features and advantages of the invention will appear from the following description taken in connection with the drawings wherein:

Figure 1 is a longitudinal section through the combination master cylinder and booster showing the parts in the free positions.

Figure 2 is a similar view illustrating the positions of the parts with the piston of the master cylinder actuated by a foot pedal and with the high pressure piston also actuated to provide fluid under high pressure in the outlet end of the booster.

Figure 3 is a cross section through the booster taken on line 3—3 of Figure 1 showing the positions of the openings between the low and high pressure areas of the device.

Figure 4 is an end elevational view of the master cylinder housing looking toward the end thereof where pressure is applied from a foot lever.

Figure 5 is a cross section through the housing taken on line 5—5 of Figure 1.

Figure 6 is a detail showing a perforated disc in the end of the piston of the master cylinder.

Figure 7 is a cross section through the disc taken on line 7—7 of Figure 6.

Figure 8 is a detail showing a washer providing a check valve in the end of the piston of the master cylinder, with the parts shown on an enlarged scale.

Figure 9 is a cross section through the washer taken on line 9—9 of Figure 8.

Figure 10 is a detail showing the cap positioned over the outlet opening which extends through a nut on the outer end of the booster cylinder with the parts shown on an enlarged scale.

Figure 11 is a cross section through the cap taken on line 11—11 of Figure 10.

Figure 12 is a longitudinal section similar to that shown in Figures 1 and 2 showing a modification and illustrating the positions of the parts in the return movement of the piston of the master cylinder whereby the pressure unseats the washer, shown in Figure 9 in order to break the vacuum whereby the piston returns with a free movement.

Referring now to the drawings wherein like reference characters denote corresponding parts the combination master cylinder and booster of this invention includes a cylinder 10 in a housing 11 with a piston 12 in the cylinder, and a booster cylinder 13 having a piston 14 therein and positioned in the outer part of an extended cylindrical casing 15 which is integral with and extends from the master cylinder housing.

The cylinder 10 is formed as illustrated in Figures 1 and 2 with threaded sections 16 and 17 that are threaded into hubs 18 and 19, respectively, of the housing 11 and the cylinder is provided with annular flanges 20 and 21 that seat against the ends of the hubs to seal the ends of the threads. The outer end of the cylinder is provided with a bead 22 having a plate 23 secured in a recess 24 therein by a spring ring 25 that snaps into an annular recess 26. The plate 23 is provided with an opening 27 through which a rod 28 extended from a brake lever extends. The rod extends into an opening 29 in the end of the piston 12 and packing rings 30 and 31 are positioned in annular recesses 32 and 33 in the piston.

The piston is provided with a flange 34 that abuts the plate 23 and also a flange 35 that is positioned between the packing washers 30 and 31.

Similar cup-shaped packing washers 36 and 37 are mounted on the opposite end of the piston and these washers are held against annular ribs or flanges 38 and 39, respectively.

The inner end of the piston is provided with a bore 40 having a perforated disc 41 positioned against a shoulder 42 therein and a check washer 43 with a pin 44 extended from the outer surface thereof is resiliently held against the inner end of the piston by a spring 45 positioned between the check washer and perforated disc.

The check washer 43 is positioned over the end of a passage 46 extended from the center of the piston to an annular recess 47 which provides communicating means with the interior of the master cylinder housing 11 and the interior of the cylinder 10 through a port 48. A similar port, the size of which is less than that of the port 48 is provided through the wall of the cylinder 10 as indicated by the numeral 49 and this port provides communicating means between the interior of the housing 11 and the inside of the cylinder 10 whereby brake fluid of the housing 11 fills the low pressure area in the outer end of the cylinder 10 and interior of the cylindrical casing 15.

A spring 50 holds the piston 12 in the position shown in Figure 1 until the piston is moved by the rod 28 of the foot lever.

The perforated disc 41 is provided with an internally threaded hub 51 which provides a seat for one end of the spring 45 with the opposite end positioned over the pin 44 of the check washer 43.

The booster cylinder 13 is provided with a threaded boss 52 by which it is threaded in the outer end of the cylinder casing 15 and a packing washer 53 is provided between the end of the casing 15 and a hub 54 on the outer end of the cylinder. A nut 55 is threaded in the outer end of the cylinder with a gasket 56 between the end of the nut and end of the cylinder and a tube 57 threaded into an opening 58 in the outer end of the nut extends to the brake system of the vehicle and provides means for carrying the brake fluid to the brakes of the system. The inner end of the nut 55 is provided with a boss 59 having an annular recess 60 and a gasket 61, positioned in the recess provides sealing means between the end of the cylinder 13 and inner end of the nut 55.

As illustrated in detail in Figure 11 a perforated cap 62 with a resilient washer 63 secured against the inner surface by a pin 64 is positioned over the boss 59 and provides a check valve preventing the return of fluid from the brake system through the perforations 65 of the cap. The cap is provided with a seat 66 having a reinforcing ring 67 therein.

The opposite end of the cylinder 13 is provided with a disc 68 which forms a head therein, the peripheral edge of the disc being held against a shoulder 69 by a spring ring 70. The disc 68 is provided with a boss 71 over which the end of the spring 50 is positioned and an opening 72 is provided through the boss and disc.

The cylinder 13 is also provided with an enlarged area 73 positioned beyond a shoulder 74 and a plurality of openings 75 with restricted inner ends 76 extend through the wall of the cylinder, as shown in Figure 3.

The outer end of the piston 14 is provided with a cup-shaped packing washer 77, the washer being held in an annular recess 78 and positioned against a flange 79 which is positioned to travel in the enlarged outer section 73 of the cylinder. A similar sealing washer 80 is provided in a recess 81 in the piston and a cup-shaped washer 82 is positioned against the end of the piston. The washer 82 is held against the end of the piston 14 by a spring 83 which also holds the piston in the position shown in Figure 1, against the disc 68 in the inner end of the cylinder 13.

The brake cylinder housing 11 is provided with a cover plate 84 that is held in position by bolts 85, threaded into lugs 86 in the upper end of the housing. The housing is also provided with mounting flanges 87 and 88, with bolt holes 89 and 90 therein respectively, and a drain plug 91 which may be positioned at any suitable point in the lower part of the housing.

In the design shown in Figure 12 a master cylinder 92 similar to the cylinder 10 and provided with a piston 93 is positioned in a housing 94 and a plug 95 is threaded into an opening 96 in the housing. The plug 95 is aligned with the cylinder 92 and a spring 97, similar to the spring 50, is positioned against the plug and piston 93.

In this figure the check washer 98 similar to the check washer 43 is shown spaced from the inner end of the bore in the end of the piston so that a vacuum that may result from the returning movement of the piston is broken and the pressures equalized on both sides of the piston.

With the parts arranged in this manner the improved master cylinder and booster are installed in a motor vehicle, or other device in the usual manner with the tube 57 connected to the line to the brakes, or the like and as the foot lever is pressed downwardly the rod 28 moves inwardly forcing the piston 12 through the cylinder 10 and with this movement low pressure is built up in the cylinder and also in the cylindrical casing 15 whereby the fluid is forced through the openings 75 and 76 into the booster cylinder 13 from where it passes through the perforations 65 of the cap 62 into the brake line through the tube 57. By this means the brakes are applied and with continued movement of the foot lever the pressure continues to build up with the fluid passing through the opening 72 into the cylinder 13 where it contacts the end of the piston 14 and the pressure of the fluid applied against the comparatively large area of the end of the piston 14 increases the pressure at the opposite end whereby the high pressure area is provided with the cup washer 82 closing the port 76 and the high pressure fluid is applied directly to the brakes of the wheels.

By this means the brakes are actuated gradually and smoothly with the brakes being applied with an easy movement and the movement is gradually accentuated until the high pressure fluid finally forces the brake shoes into positive gripping relation with the drums.

With the initial movement of the foot lever the piston 12 starts to travel inwardly with the cup washer 37 closing the port 49 so that the only escape of fluid in the inner end of the cylinder 10 and casing 15 is through the ports 76 into the cylinder 13 and from there into the brake line. Upon return movement of the piston the vacuum is relieved with the pressure thereof opening the check washer 43 whereby communication is established between the master cylinder housing 11 and the interior of the cylinder through the port 48.

This master cylinder and booster combination, therefore, insures positive action in both applying the brakes and also in the release thereof.

It will be understood that modifications may be made in the design and arrangement of the parts without departing from the spirit of the invention.

What is claimed is:

1. In a brake system including a master cylinder having a piston therein, a cylindrical casing, a cylindrical boss extending into said casing and provided with an annular hub, said boss having its inner end shaped to provide a booster cylinder, a nut arranged in engagement with the interior of said hub, there being an opening in said nut, a tube extending from the opening in said nut and adapted to be connected to the brake system for the passage therethrough of brake fluid, a perforated cap arranged contiguous to the inner end of said nut, a resilient washer positioned adjacent the inner surface of said cap, a pin for maintaining said washer connected to said cap, a coil spring having an end engaging said cap, a piston reciprocably mounted in said cylinder, a cup shaped washer positioned against an end of said last named piston and engaging said coil spring, there being a space between said cylinder and casing, said cylinder being provided with a plurality of spaced openings for establishing communication between said space and the interior of said cylinder, the interior of said cylinder being provided with an enlarged chamber, an annular flange extending from said last named piston and adapted to travel in said enlarged chamber, a shoulder arranged interiorly of said cylinder, a disc abutting said shoulder and provided with a central opening therein, there being a tapered finger on the end of said last named piston mounted for movement into and out of bridging relation with respect to the opening in the disc, and resilient means interposed between the piston of the master cylinder and said disc.

2. The apparatus as described in claim 1, wherein said resilient means comprises a coil spring.

References Cited in the file of this patent

UNITED STATES PATENTS

| Number | Name | Date |
|---|---|---|
| 1,885,121 | Loweke | Nov. 1, 1932 |
| 2,126,490 | Martin | Aug. 9, 1938 |
| 2,166,742 | Lambert | July 18, 1939 |
| 2,191,716 | Hunt | Feb. 27, 1940 |
| 2,232,113 | Katcher | Feb. 18, 1941 |
| 2,239,673 | Fowler | Apr. 29, 1941 |
| 2,272,360 | Swift | Feb. 10, 1942 |
| 2,273,924 | Bowen | Feb. 24, 1942 |
| 2,396,155 | Christensen | Mar. 5, 1946 |
| 2,446,884 | Price | Aug. 10, 1948 |
| 2,564,137 | Wahlberg | Aug. 14, 1951 |